United States Patent [19]

Conrad

[11] 4,167,463
[45] Sep. 11, 1979

[54] NITROGEN FIXATION WITH A HIGH ENERGY LASER

[75] Inventor: Raymond W. Conrad, Russellville, Ala.

[73] Assignee: The United States of America as represented by the Secretary of the Army, Washington, D.C.

[21] Appl. No.: 895,837

[22] Filed: Apr. 12, 1978

[51] Int. Cl.² .......................... B01J 1/10; B01K 1/00
[52] U.S. Cl. .............................. 204/157.1 R; 250/527
[58] Field of Search ................ 204/157.1 R, DIG. 11; 250/527

[56] References Cited

U.S. PATENT DOCUMENTS

| | | | |
|---|---|---|---|
| 3,227,642 | 1/1966 | Lemelson | 204/157.1 R |
| 4,025,787 | 5/1977 | James et al. | 250/527 |

*Primary Examiner*—Howard S. Williams
*Attorney, Agent, or Firm*—Nathan Edelberg; Robert P. Gibson; Jack W. Voigt

[57] ABSTRACT

Disclosed is a method and device for the fixation of atmospheric nitrogen utilizing the very high temperature and rapid quenching rates of plasmas produced by the focused beam of a repetitively-pulsed, high energy laser. The irradiance at the focal point of a mirror employed in the nitrogen fixation reaction chamber exceeds that required for plasma production in clear air, namely: $10^9$ watts/cm² at 10.6 micrometers; consequently, a plasma is produced every time the laser pulses. The laser pulse length being short causes rapid quenching of the plasma thereby preventing decomposition of the nitric oxide formed from a mixture of nitrogen and oxygen introduced at an elevated pressure through an inlet to the nitrogen fixation reaction chamber. The reaction gas mixture containing the nitric oxide is extracted from the reaction chamber through an outlet means. The nitric oxide is subsequently removed by scrubbing with water, or by other extraction techniques well established in the art.

8 Claims, 1 Drawing Figure

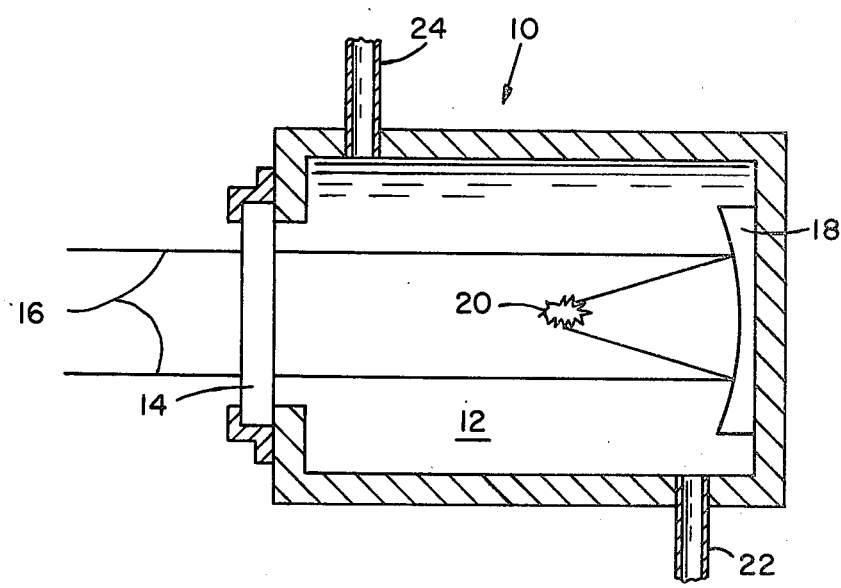

NITROGEN FIXATION WITH A HIGH ENERGY LASER

DEDICATORY CLAUSE

The invention described herein may be manufactured, used, and licensed by or for the Government for governmental purposes without the payment to me of any royalties thereon.

BACKGROUND OF THE INVENTION

The nitrogen cycle is a continuous series of natural processes by which nitrogen passes through successive stations in air, soil, and organisms involving principally decay, nitrogen fixation, nitrification, and denitrification. The natural fixation of nitrogen as accomplished by lightning has long been recognized as essential to the continuation of plant and animal life. Because of the heavy demands on naturally occurring nitrogen available in farm lands, a depletion of nitrogen from the soil is constantly taking place, thereby requiring constant replacement of nitrogen through the wide use of nitrogen-containing chemical fertilizers.

The fixation of nitrogen from the atmosphere is the first and most important step in the production of nitrogen-containing chemical fertilizers. The method which is currently almost universally employed is the Haber process, which utilizes high temperatures and pressures to catalytically react molecular nitrogen and hydrogen to produce ammonia. A much less widely employed technique is the arc process, in which air is passed through a high power electric arc, to produce oxides of nitrogen. Both processes consume large quantities of energy. The Haber process uses large quantities of natural or petroleum gas to obtain the requisite high temperatures. This process also requires gaseous hydrogen, which is usually prepared electrolytically. The arc process consumes vast quantities of electrical power. In addition, non-replaceable resources are consumed.

An object of this invention is to provide a device to effect fixation of atmospheric nitrogen utilizing the high temperatures of plasmas.

A further object of this invention is to provide a method for fixation of nitrogen utilizing the very high temperatures and rapid quenching of plasma produced by the focused beam of a repetitively-pulsed, high energy laser.

SUMMARY OF THE INVENTION

The method of this invention employs a device for the fixation of atmospheric nitrogen utilizing the very high temperatures and rapid quenching rates of plasmas produced by the focused beam of a repetitively-pulsed, high energy laser. Mixtures of nitrogen and oxygen, e.g., atmospheric air, are introduced into a nitrogen fixation reaction chamber at an elevated pressure. The chamber contains a window which permits laser radiation to enter, a focusing mirror to concentrate the laser radiation sufficiently to produce a plasma, and an inlet and outlet for the gaseous materials. The high temperature which occurs in the plasma produces high concentrations of nitric oxide. The nitric oxide however, must be rapidly quenched to a lower temperature to prevent decomposition to nitrogen and oxygen. This rapid quenching is achieved by the rapid decay of the plasma following the termination of the laser pulse, by the mechanisms of recombination and the rapid expansion of the hot plasma into the surrounding cool gas. The reacted gas mixture is allowed to flow from the reacting chamber and the nitric oxide is extracted by scrubbing with water, or by other techniques known to those skilled in the art.

The high energy laser utilized in this technique must operate at a wavelength conducive to plasma formation, produce sufficient energy to produce a plasma, and have a pulse length short enough to cause rapid quenching of the plasma. Many laser devices, currently in use, satisfy these conditions, and are known to those skilled in the art.

BRIEF DESCRIPTION OF THE DRAWING

The single FIGURE of the drawing is a schematic view, partially in section, of the device employed in accordance with the method of this invention to effect fixation of atmospheric nitrogen.

DESCRIPTION OF THE PREFERRED EMBODIMENT

A device disclosed for fixation of atmospheric nitrogen in accordance with this invention utilizes the very high temperature and rapid quenching rates of plasmas produced by the focused beam of a repetitively-pulsed, high energy laser.

In further reference to the drawing which depicts a device 10 for fixation of atmospheric nitrogen, there are shown the associated components and identities of the device comprising a reaction chamber 12 that is provided with a first inlet means and an outlet means for gas mixture flow. The reaction chamber is provided with a second inlet means that is a window 14. The window is transparent to the radiation beam 16 from a high-powered, repetitively-pulsed, infrared laser (not shown). A short focal length concave mirror 18 interior to the reaction chamber 12 focusses the incoming laser radiation to a very high irradiance to produce plasma 20. The concave or parabolic focusing mirror is provided with cooling means (not shown, e.g. water-cooled) to prevent thermal deformation. A first inlet means for admitting a mixture nitrogen and oxygen, either ambient air or a mixture close to stoichiometry, is shown by numeral reference 22. An outlet means for extracting the reacted mixture is shown by numeral reference 24. The extracted reaction mixture is passed into a scrubber where the nitric oxide is extracted.

As a specific example, the laser can be a repetitively-pulsed, $CO_2$ laser, producing several kilojoules of energy in a pulse of from a few nanoseconds to several tens of microseconds in length. The beam is expanded to a diameter of thirty cm prior to entering the reaction chamber, so that the irradiance at the entrance aperture of the chamber is not high enough to damage the window, which is fabricated from zinc selenide. After entering the chamber, the beam is collected and focussed by the parabolic focusing mirror, which is fabricated from molybdenum or copper and is water-cooled to prevent thermal deformation. The irradiance at the focal point of the mirror exceeds that required for plasma production in clear air, viz., $10^9$ watts/cm$^2$ at 10.6 micrometers, and consequently a plasma is produced every time the laser pulses. The pressure and rate of gas flow through the chamber is chosen to maximize the yield of nitric oxide.

It is to be understood that other laser wavelengths or pulse lengths, and other mirror and window materials other than the one described above can be used in this invention. The particular laser and materials used will depend upon the energy efficiency of available laser devices, and the efficiency of these devices for producing plasmas in mixtures of nitrogen and oxygen.

I claim:

1. In combination with a high energy repetitively-pulsed laser radiation source that is capable of producing laser radiation of a wavelength that is effective for producing plasmas in gases, a device for fixing nitrogen to form nitric oxide, said device comprising:

(a) a reaction chamber;
   (b) a first inlet means secured to said reaction chamber for introducing into said reaction chamber a reactant gas mixture comprised of nitrogen and oxygen;
   (c) a second inlet means secured to said reaction chamber for admitting into said reaction chamber said laser radiation wavelength, said second inlet means being a window that is transparent to said laser radiation wavelength;
   (d) a focusing means positioned within said reaction chamber for concentrating said laser radiation wavelength sufficiently to produce, each time said high energy repetitively-pulsed laser radiation source is pulsed, a plasma wherein said nitrogen and oxygen in said reactant gas mixture are reacted to form nitric oxide in a reacted gas mixture, said nitric oxide being rapidly quenched to a lower temperature to prevent decomposition thereof, said quenching effected by rapid decay of said plasma achieved by the mechanism of recombination and the rapid expansion of said plasma into the surrounding cool gas; and,
   (e) an outlet means secured to said reaction chamber for extracting said reacted gas mixture containing said nitric oxide.

2. The device for fixing nitrogen as set forth in claim 1 wherein said high repetitively-pulsed laser radiation source is a repetitively-pulsed $CO_2$ laser.

3. The device for fixing nitrogen as set forth in claim 1 wherein said window is fabricated from zinc selenide.

4. A method for fixing nitrogen which employs a high energy repetitively-pulsed laser radiation source that is capable of producing plasmas in gases in a reaction chamber wherein said plasma has a sufficiently high temperature to form high concentrations of nitric oxide, said method comprising:

(i) introducing a gas mixture comprising nitrogen and oxygen into a reaction chamber fitted with a first inlet and an outlet means and adapted for operating at an elevated pressure;
   (ii) admitting laser radiation wavelength in an expanded beam through a second inlet means to said reaction chamber, said laser radiation being admitted in an expanded beam which has irradiance at said second inlet means that is sufficiently low to prevent damage to said second inlet means which is a window transparent to said laser radiation wavelength;
   (iii) collecting said expanded beam and focusing said expanded beam with a focusing means which is a parabolic focusing mirror to yield an irradiance which is sufficient to produce a plasma at the focal point of said parabolic focusing mirror;
   (iv) producing a plasma each time said high energy repetitively-pulsed laser radiation source is pulsed to form high concentrations of nitric oxide in said plasma and in a resulting reacted gas mixture, said nitric oxide being rapidly quenched to a lower temperature to prevent decomposition thereof, said quenching effected by rapid decay of said plasma following termination of laser pulse, said rapid decay of said plasma achieved by the mechanism of recombination and the rapid expansion of said plasma into the surrounding cool gas;
   (v) adjusting the flow rate of said introduced gas mixture and said reacted gas mixture to maximize the yield of said nitric oxide in said reacted gas mixture which is to be extracted to yield said nitric oxide, and,
   (vi) extracting said reacted gas mixture to effect removal of the nitric oxide present in said extraction reacted gas mixture.

5. The method of claim 4 wherein said high energy repetitively-pulsed laser radiation source is a $CO_2$ laser and wherein said parabolic focusing mirror employed is fabricated of molybdenum, said molybdenum parabolic focusing mirror provided with water-cooling means to prevent thermal deformation.

6. The method of claim 5 wherein said window is fabricated of zinc selenide.

7. The method of claim 4 wherein said high energy repetitively-pulsed laser radiation source is a $CO_2$ laser and wherein said parabolic focusing mirror employed is fabricated of copper, said copper parabolic focusing mirror provided with water-cooling means to prevent thermal deformation.

8. The method of claim 7 wherein said window is fabricated of zinc selenide.

* * * * *